US008549273B1

United States Patent
Deetz et al.

(10) Patent No.: US 8,549,273 B1
(45) Date of Patent: Oct. 1, 2013

(54) METHOD AND APPARATUS TO PRESENT A UNIQUE BACKGROUND IMAGE ON A PERSONAL COMPUTER DISPLAY WHEN THE COMPUTER SYSTEM IS BOOTED FROM AN EXTERNAL DRIVE

(75) Inventors: Randell Deetz, Costa Mesa, CA (US); Gary William Streuter, San Clemente, CA (US); Kenneth Burke, Laguna Hills, CA (US); James Sedin, Katchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 592 days.

(21) Appl. No.: 12/730,351

(22) Filed: Mar. 24, 2010

Related U.S. Application Data

(60) Provisional application No. 61/162,968, filed on Mar. 24, 2009.

(51) Int. Cl.
*G06F 9/24* (2006.01)
*G06F 15/17* (2006.01)

(52) U.S. Cl.
USPC .................................................. 713/2; 713/1

(58) Field of Classification Search
USPC ........................................................ 713/1, 2
See application file for complete search history.

(56) References Cited

U.S. PATENT DOCUMENTS

| | | | |
|---|---|---|---|
| 5,627,964 A | 5/1997 | Reynolds et al. | |
| 5,784,549 A | 7/1998 | Reynolds et al. | |
| 6,373,498 B1 * | 4/2002 | Abgrall | 345/619 |
| 6,567,868 B1 | 5/2003 | Tran et al. | |
| 7,155,604 B2 * | 12/2006 | Kawai | 713/2 |
| 8,028,158 B1 * | 9/2011 | Streuter et al. | 713/2 |
| 2003/0154367 A1 * | 8/2003 | Kawai | 713/1 |
| 2005/0198485 A1 * | 9/2005 | Nguyen et al. | 713/1 |
| 2007/0136568 A1 * | 6/2007 | Ding | 713/1 |
| 2008/0263349 A1 * | 10/2008 | Ota et al. | 713/2 |

* cited by examiner

*Primary Examiner* — Vincent Tran
(74) *Attorney, Agent, or Firm* — Law Office of Scott C. Harris, Inc.

(57) ABSTRACT

A backup system on an external bootable personal computer drive that presents a unique and specific wall paper display on the computer monitor when the operating system residing on the drive is booted when the drive is externally attached to the computer system. The invention is used to make it obvious to the user that the original system drive has been replaced by a cloned or imaged drive. The invention consists of a software program and a graphics file. The software program recognizes the case where the drive it resides on has been booted over an external bus and when that event occurs the software program substitutes a specific graphic file for the normal wall paper file used to display the background on the computer display.

14 Claims, 5 Drawing Sheets

METHOD AND APPARATUS TO PRESENT A UNIQUE BACKGROUND IMAGE ON A PERSONAL COMPUTER DISPLAY WHEN THE COMPUTER SYSTEM IS BOOTED FROM AN EXTERNAL DRIVE

This application claims priority from provisional application No. 61/162,968, filed Mar. 24, 2009, the entire contents of which are herewith incorporated by reference.

BACKGROUND

Software programs that backup data from a personal computer onto some external storage have been utilized by computer users for a relatively long period of time. These software have progressed from simple file transfer utilities to where they now create compressed images of the data to be backed up to creating bootable backup drive[s] that are cloned images or bootable versions of the system drive. The CMS products "bounce back" software for example can create both cloned images and bootable versions of the system.

These software programs use many methods of restoring the system drive if the system drive becomes unbootable or corrupted due to any number of reasons such as virus attacks or psychotic software destroying files and operating system programs. Otherwise, restoration or rebuilding of the system disk can take many hours to complete which is not a desirable operation when access to a computer is critical.

A second method which is relatively recent in concept and ability is to boot from an attached imaged backup drive. The ability to perform this type of boot has only been available since approximately 2008. Prior to this time, most BIOS' of personal computers did not support booting from external devices that are attached to the personal computer through other than a system bus.

External booting presents a number of challenges to the user with the first being able to actually create a bootable drive. Typically external bootable drives are difficult to create.

SUMMARY

Once an external bootable drive is created, the inventors recognize that it is desirable to alert a user that the external drive is the boot drive.

Users have confused the internal system drive with an external drive. At the present time, there is no way that a cloned or imaged system drive can make itself known to the casual user of a computer system if it was booted from an external drive.

An embodiment describes a computer system which alerts a user about whether the system drive is a cloned or image of the original system drive and is externally attached to the computer system.

In one embodiment, the imaged system drive will, upon being booted, present the user with a unique wall paper display such that is prominent and makes it difficult for the user to mistake the origin or location of the system drive.

In another embodiment, the software restore program will, if the user directs the software to restore the system drive from the booted attached drive, restore the user's original wall paper display.

In a third embodiment, the software will, if the user replaces the internal system drive with the externally attached drive, restore the user's wall paper display at boot time.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which.

DETAILED DESCRIPTION

Figure 1:
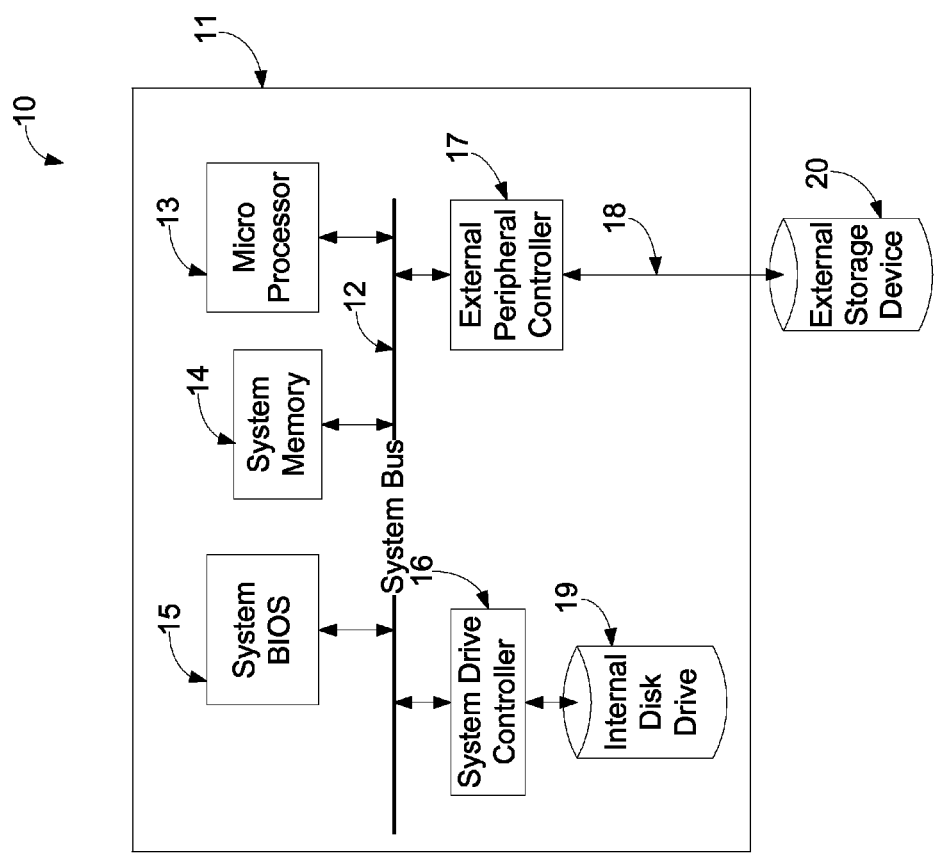
FIG. 1 is a schematic diagram of a typical personal computer with an externally attached storage device.
Figure 2:
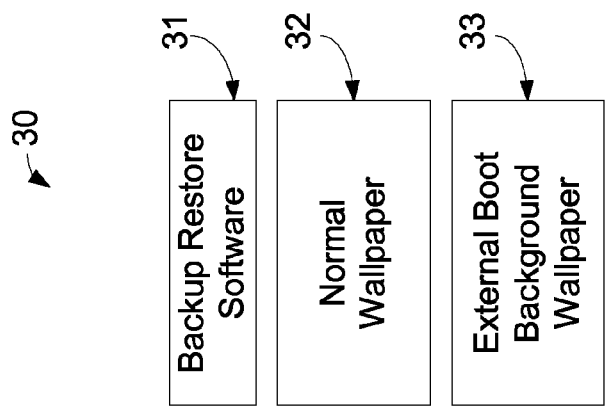
FIG. 2 depicts the software suite of the invention along with the wall paper display files.

In the following, preferable embodiments of the present invention are described by referring to the drawings. Embodiments of the present invention are illustrated by way of example, and not by way of limitation. In the figures, the same reference numerals designate the same or corresponding parts throughout the different views, and redundant explanations may be omitted.

Now referencing the drawings, more specifically FIG. 1 where 10 is a schematic representation of a typical personal computer system. The personal computer system 11 contains system bus 12, micro processor 13, system memory 14, system BIOS 15, system drive interface 16, and external peripheral controller 17. Internal disk drive 19 is the normal system boot drive and external storage device 20 is the backup storage device attached external peripheral controller 17 through external bus 18.

Under normal operation, that is where no problems exists, selection of internal disk drive 19 as the boot device is made by system BIOS 15 at system reset time or system power on time. Normally, the operating system for personal computer system 11 will be booted from internal disk drive 19. After the boot sequence is complete, the user will at some point in time connect or attach external storage device 20 and cause backup restore software 31 to be executed. Backup restore software 31 will partition and format external storage device 20. External storage device 20 may be any of a plurality of attachable storage devices such as rotating magnetic hard disk drives, flash memory thumb drives, compact flash drive, or any other storage device of sufficient size to contain all of the data and software held on internal disk drive 19.

External storage device 20 is attached to personal computer system 11 through external bus 18 and external peripheral controller 17. External peripheral controller may be any of a plurality of external peripheral controllers such as USB controller, IEEE-1394 controller, E-SATA controller, Express Card controller, Ethernet controller, 802.11 wireless controller, or any other commonly used external peripheral controller used to connect external devices to a personal computer system bus.

When external storage device 20 is initially attached to personal computer box 11, backup restore software 31 will be, under user direction, be loaded into system memory 14 and executed. Backup restore software will partition external storage device and create a master boot record and other data structures necessary to allow external storage device 20 to be a bootable device.

Figure 3:
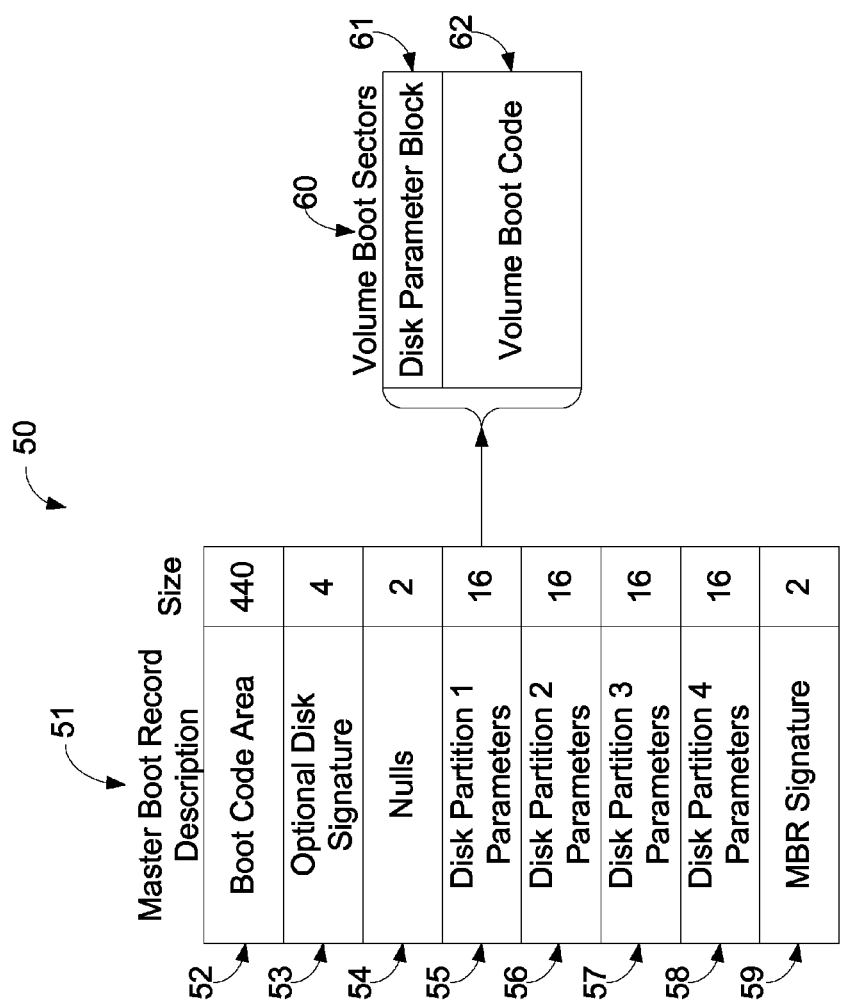
FIG. 3 depicts a normal master boot record and volume boot sectors

Now referencing FIG. 3 where 50 depicts the master boot record and volume boot sectors. The master boot record or MBR, is depicted as 51 and the volume boot sectors as 60. MBR 51 is the first sector or sector address 0 on a storage device. The MBR 51 is 512 bytes in length. MBR 51 typically contains 440 bytes of machine instructions that can determine of disk partition 1 parameter 55 points to (is an address pointer) a valid partition on the device and if partition 1 contains an operating system. If disk partition 1 parameter 55 references a partition with a valid operating system, that reference will point to the first of a series of sectors referred to as volume boot sectors 60. Within these sectors is disk parameter block 61 and volume boot code 62. Boot code area 52 will read volume boot sectors 60 from the same storage device into system memory and transfer processing control to volume boot code 62. Volume boot code 62 contains intelligence of the file system used to manage storage device on which it resides. Volume boot code 62 will find the operating system through the file system and read a sufficient amount of the operating system into the system memory and transfer control to it.

After building master boot record 51 on external storage device 20, backup restore software 31 will transfer all data and program files from internal disk drive 19 to external storage device, one file or one file part at a time. This method of moving whole files from one storage device to another has 2 major side benefits as opposed to performing a bit by bit copy of internal disk drive 19 to external storage device 20. First, the external storage device file structure will be a defragmented version of that found on internal disk drive 19. Any problems with the directory structure found on internal disk drive 19 will not be replicated on external storage device 20. Also, the external storage device 20 may be larger than internal disk drive 19. Any time after backup restore software 31 has transferred the software and data from internal disk drive 19 to external storage device 20, the user will be able to boot from external storage device 20.

If internal disk drive 19 fails and becomes unbootable, the external drive can be used as the new boot drive. Depending on system BIOS 15, the user may need to alter the boot settings during boot time. System bios 15 typically contains a block of user interface code that can be invoked by the user holding down some predetermined key on the system keyboard while the system is being booted. During the bios boot process, system BIOS 15 will check to see if the predetermined key is being depressed by the user. If the key is depressed, system BIOS 15 will begin executing the user interface. Among the options the block of user interface code provides is the ability of the user to change the behavior of the boot sequence such that system BIOS 15 will either attempt to boot from internal disk drive 19 or external storage device 20. Any of these storage devices may be selected as the first boot device or the second boot device.

A purpose behind allowing different storage devices to be selected as the first, second, or third boot device is to provide for the case where the primary boot device is defective or the user wants to boot from a device other than the system drive. Once a boot device has been selected as the primary boot device, the boot sequence is essentially the same, regardless of the actual device containing the boot code.

Once the user has reset the boot order such that internal disk drive 19 is the primary boot device, an external storage device 20 becomes the second boot device. If system BIOS 15 cannot complete a boot sequence from internal disk drive 19, it will, after some predetermined period of time, initiate a second boot sequence from external storage device 20.

Figure 4:
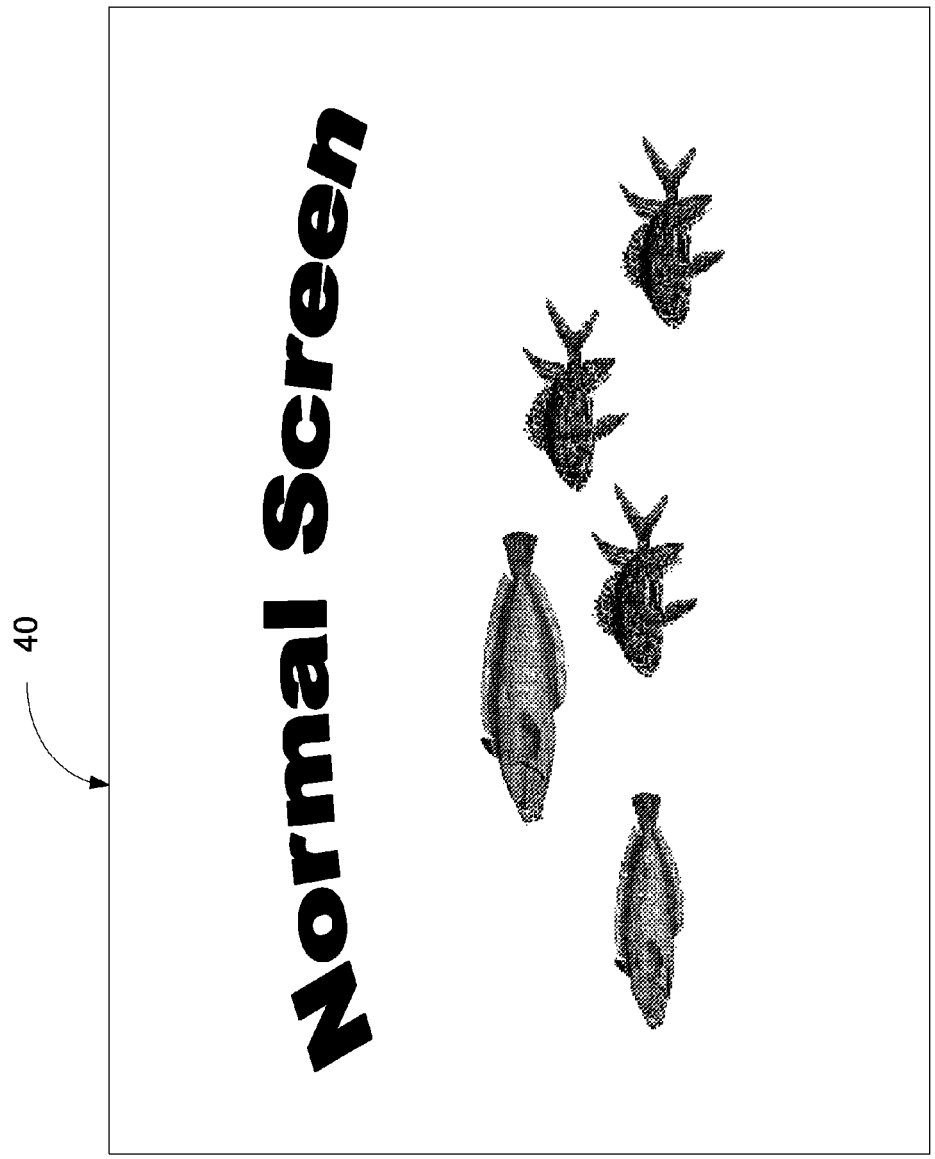
FIG. 4 depicts the personal computer display device showing the original wall paper display.
Figure 5:
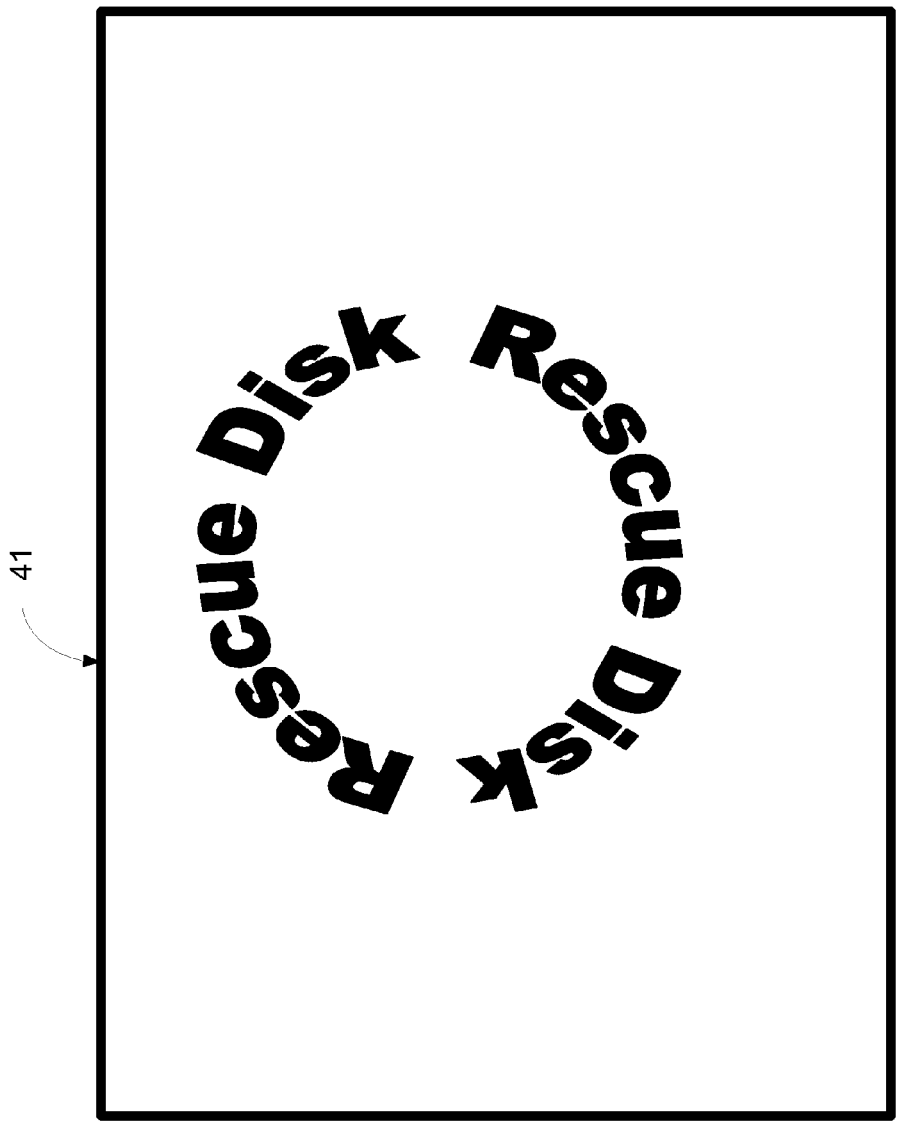
FIG. 5 depicts the personal computer display device showing the special wall paper to alert the user that the boot device is the externally attached storage device.

After the boot sequence has been completed from external storage device 20 and the operating system is running, the normal desk top wall paper 40 as shown in FIG. 4 will be replaced with rescue wall paper 41 shown in FIG. 5. Backup restore software 31 changes the system pointer for the desktop wall paper for the system variables contained on external storage device 20 from normal desktop wallpaper 32 (depicted as normal desk top wall paper 40 in FIG. 4) to external boot background wallpaper 33 (depicted as rescue wall paper 41 in FIG. 5). This change in wall paper alerts the user in a very graphic manner that personal computer system 11 is running off of external storage device 20.

In this description, the word "wallpaper" refers to any kind of screen which is shown from the operating system to the user. A conventional wallpaper might include the entire background shown as the background for the complete screen. FIG. 4 shows the complete background for the complete screen as wallpaper 40. However, wallpaper may alternatively be on only a portion of the screen, or maybe for example special kinds of icons on the screen. For example, in certain versions of the Windows operating system, the wallpaper covers only portions of the screen, with other portions of the screen reserved for items like toolbars, task bars, and/or widgets. All of these are intended to be included within the term "wallpaper".

In one embodiment, the wallpaper covers the background of substantially the entire viewable area of the screen other than toolbars and widgets.

If the user wants to restore the software and data on internal disk drive 19 or replaces internal disk drive 19 with a fresh disk, the user can invoke backup restore software 31 from external storage device 20. When this happens, external storage device 20 will partition internal disk drive 19 and create a master boot record and other data structures necessary to allow internal disk drive 19 to become a bootable device. After this procedure has completed, the user may initiate a reboot sequence and system BIOS 15 will boot from system drive 16. Then, the reboot sequence again automatically changes the wallpaper pointer so that the wallpaper reverts back from the special wallpaper 41 to the original wallpaper 40.

If external storage device 20 contains a compatible disk drive that can be placed into personal computer system 11 and connected to system drive controller 16 the user can choose to perform this action and reboot the system. Once the system has been rebooted from the new internal disk drive 19, backup restore software 31 will, the first time it is executed, restore the system pointer for the desktop wall paper for the system variables contained on internal disk drive 19 from external boot background wallpaper 33 (depicted as rescue wall paper 41 in FIG. 5) to normal desktop wallpaper 32 (depicted as normal desk top wall paper 40 in FIG. 4).

According to embodiments, either or both drives can operate according to USB specifications; IEEE 1394 specifications; ESATA specifications or any other. The drive can be connected over an Ethernet network. The first external bus can be a PCMCIA bus or a PC Express bus. The first external bus can be an implementation of a wireless network such as:

a. IEEE 802.11 series of network standards;
    b. Wireless USB standard;
    c. Bluetooth specification level 3.0 or later.

The external storage device can be any of:

a. rotating magnetic hard disk drive;

b. rotating magneto optical hard disk drive.

The external storage device is a flash memory device can be contained inside a:
  a. thumb drive device;
  b. any of the devices more commonly known as secure digital media;
  c. solid state drive device;
  d. personal digital assistant (PDA) device;
  e. camera;
  f. mobile telephone.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other ways of indicating the fact that a backup drive is being used may be contemplated according to the present system. For example, instead of using wallpaper which covers substantially all of the background, an icon can be used. In addition, while the wallpaper described above includes a different picture, it can automatically change the color of the existing wallpaper, for example to a complementary color. Another embodiment might display a wallpaper style icon across the entire existing wallpaper.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system comprising:
    a. A personal computer system comprising at least:
        i. a system drive controller;
        ii. a first internal storage device attached to said system drive controller through a first internal bus;
        iii. said first internal storage device is a bootable system drive;
        iv. a first external bus connected to said internal bus through a first external bus controller;
        v. a first external storage device residing outside of said computer system and attached to said first external bus;
        vi. a system BIOS operating to boot an operating system from said bootable system drive or from said first external storage device;
    b. said personal computer system operating a first software program residing on said system drive, which is programmed for:
        i. creating at least one bootable partition on said first external storage device;
        ii. copying software and data residing on said system drive to said first external storage device effective such that said first external storage device is bootable; and
        iii. automatically setting a system variable residing on said first external storage device that specifies a unique desktop background wall paper to be displayed when said first external storage device is used as the boot device when attached to the said first external bus
    c. said first software program will, upon first being executed after the system is booted, detect when said first external storage device has been substituted for said system drive will, automatically set said system variable to use an original desktop wallpaper in response to said detecting.

2. A system as in claim 1, wherein said unique desktop background wall paper covers substantially an entire viewable portion of a screen.

3. A system as in claim 2, wherein said unique desktop background wall paper includes at least one picture which is different when said first external storage device is used than it is when said internal storage device is used.

4. A system as in claim 2, wherein said unique desktop background wall paper includes at least one color for the entire desktop which is different when said first external storage device is used then it is when said internal storage device is used.

5. A system comprising:
    a. A personal computer system comprising at least:
        i. a system drive controller;
        ii. a first internal storage device attached to said system drive controller through a first internal bus;
        iii. said first internal storage device is a bootable system drive;
        iv. a first external bus connected to said internal bus through a first external bus controller;
        v. a first external storage device residing physically outside of said computer system and attached to said first external bus;
        vi. a system BIOS capable of booting an operating system from either of said bootable system drive or from said first external storage device;
    b. said personal computer having a first software program residing on said first external storage device and, when said first external storage device is the boot device, said first software program programmed for:
        i. creating at least one bootable partition on said system drive;
        ii. copying software and data residing on said first external
    storage device to said first system drive to make said first system drive bootable;
        iii. setting a system variable residing on said first system drive that specifies the original desktop background wall paper picture to be displayed when said first system drive is used as the boot device;
    c. said first software program will, upon first being executed after the system is booted, detect when said first external storage device has been substituted for said system drive will, automatically set said system variable to use an original desktop wallpaper in response to said detecting.

6. A system as in claim 5, wherein said original desktop background wall paper covers substantially an entire viewable portion of a screen.

7. A system as in claim 5, wherein said original desktop background wall paper includes at least one picture which is different when said first external storage device is used then it is when said internal storage device is used.

8. A system as in claim 5, wherein said original desktop background wall paper includes at least one color for the entire desktop which is different when said first external storage device is used then it is when said internal storage device is used.

9. A computer program product, comprising a non-transitory computer usable medium having computer readable program code embodied thereon, said computer readable program code operating to program a computer system to carry out the steps of:
    normally booting and operating from an internal system drive which includes an operating system and plural different files for interacting with and being used on said operating system;
    during a time of using said operating system, displaying a first wallpaper on a screen of the computer system, said wallpaper covering substantially an entire screen of the computer system other than areas for toolbars and other similar areas;

backing up said operating system and plural different files onto a backup drive, in a way such that said backup drive becomes bootable and can be used to provide a copy or a backup of said operating system;

automatically detecting an error in said internal system drive;

automatically booting from said backup drive, based on said automatically detecting an error; and responsive to said automatically booting from said backup drive, setting a setting within the operating system which automatically changes a system wallpaper from said first wallpaper to a second wallpaper which is a unique wallpaper associated with said automatically booting from said backup drive; and responsive to first being executed after the system is booted, detecting when said backup drive has been substituted for said system drive, and automatically setting said system to use an original desktop wallpaper in response to said detecting.

10. A product as in claim 9, wherein said second wallpaper has a different picture than said first wallpaper.

11. A product as in claim 9, further comprising automatically detecting that said backup drive has been set as a new main system drive, and automatically restoring the wallpaper to be the first wallpaper.

12. A product as in claim 9, further comprising allowing steps which automatically allows switching from a main system drive to the backup drive as being a new main system drive.

13. A product as in claim 12, further comprising periodically updating the files on said backup drive to maintain a current backup.

14. A product as in claim 9, wherein said main system drive is an internal drive, and said backup drive is an external drive.

* * * * *